United States Patent Office 3,177,036
Patented Apr. 6, 1965

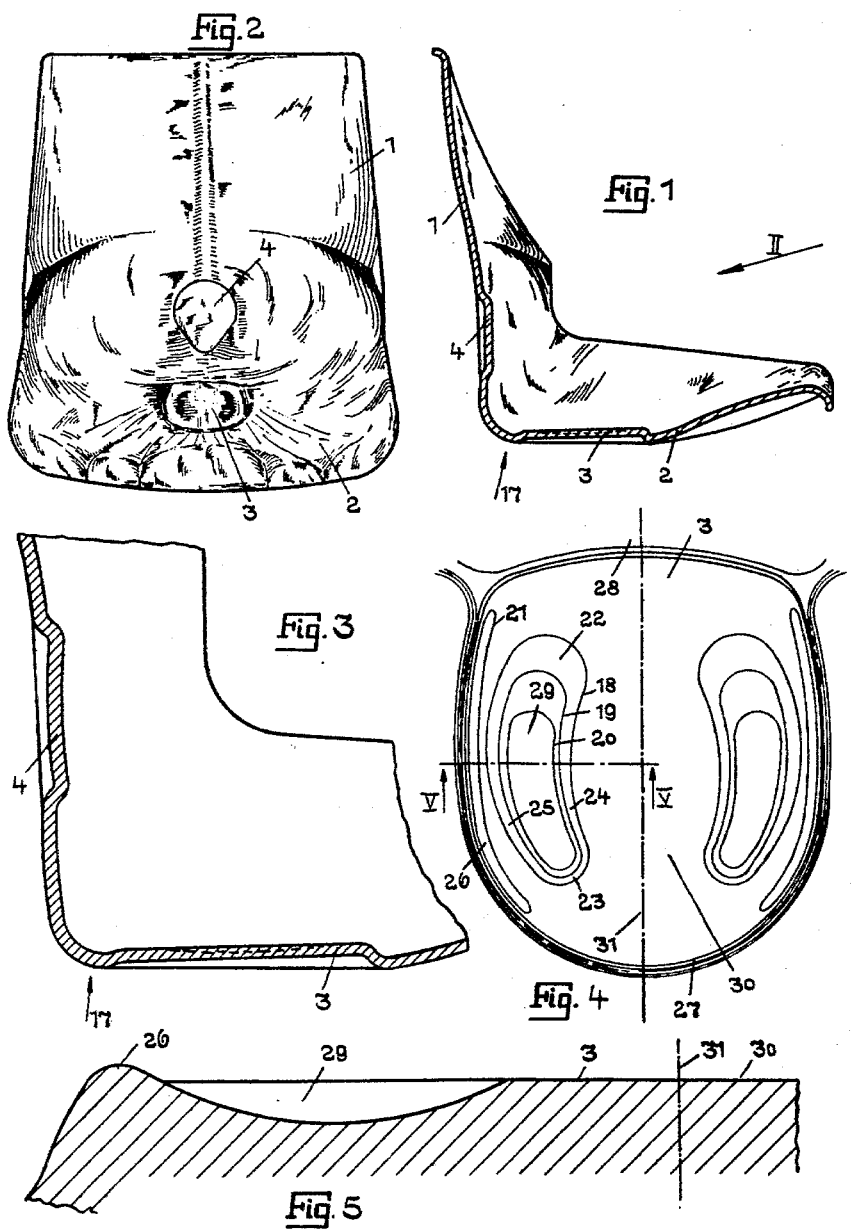

3,177,036
SEAT DEVICE
Ludwig Halter, Sommerberg 16, Wildbad,
Black Forest, Germany
Filed Mar. 28, 1963, Ser. No. 268,825
7 Claims. (Cl. 297—454)

The present invention relates to a seat device adapted to the shape of the body comprising a seat portion and a back rest.

For an example of a form of seat device heretofore reference may be made of my prior Patent No. 2,970,638, issued February 7, 1961. This patent describes a seat device adapted to the shape of the body comprising a seat portion and a back rest, said seat portion being shaped generally to the form of the seat and thighs of a person sitting in normal relaxed position, and the back rest being shaped generally to the form of the back of a person sitting in normal relaxed position, said seat portion being provided at its central portion near the rear of said seat portion with a slightly protruding area forming a firm support for the ischium tubers only of the seated person, and the back rest being provided with a slightly protruding area located centrally of said back rest to form a firm support for the os sacrum only of the seated person, whereby the major support of the seated person is by means of the ischium tubers and os sacrum, the distance of protrusion of said protruding areas being sufficient to assure that the muscular portions of the seat, thighs and back of the seated person bear less heavily on the remaining areas of the seat portion and of the back rest.

In the seat device according to my prior patent, it is presupposed that comfortable, natural sitting is only possible if the seat shape pays due attention to the anatomical requirements of the human body. Thus, the body must be supported in those portions which are suitable for such support whereas the remaining portions must be correspondingly relieved of load. The seat device according to my prior patent makes provision for the most advantageous seated posture (degree of pelvic inclination) and also for the physiological curvature of the vertebral column from the posterior, in the sitting posture. The seating posture compelled by the seat is so selected that, whilst ensuring optimum space for digestion and respiration, the blood circulation is assisted to the maximum degree and, at the same time, the pelvis and trunk muscular system, i.e. the muscular system of the abdomen, pelvis and back, is to a considerable extent relieved of load, but ready to function.

The present invention relates to a further development of the seat device according to my prior patent. In the seat device according to this invention, the support surface in the seat portion has two flat, elongated troughs which are arranged symmetrically with respect to the central plane of the seat portion and each of which is adapted to receive an ischium tuber. These troughs provide a still better means of support for the seated person than is provided by the seat device according to my prior patent. The troughs prevent the slipping-off of the ischium tubers from the support surface therefor and ensure that the seated person will adopt the correct posture.

Seats with curved sitting surfaces are per se not novel. Thus, a seat is known wherein the sitting surface is higher at the two lateral edges than at the other points. This known seat, however, has not got a support surface associated with the ischium tubers, nor does it provide flat elongated troughs arranged symmetrically with respect to the central plane of the seat, for receiving the ischium tubers. Thus, the effect according to the invention cannot be attained with the known seat.

In the seat according to the invention, the troughs are advantageously relatively shallow, so that the main function of the support surface in the seat portion, i.e. the support of the ischium tubers, is not lost.

According to a further feature of the invention, the rear end of each trough has a gradual incline, while the front end and sides of each trough have a steeper inclination.

In order further to increase the support provided for the ischium tubers, the lateral edge of the support surface adjacent each trough preferably projects slightly above the plane of the support surface. The extent of projection of the lateral edge is conveniently approximately a third of the greatest trough depth.

Advantageously, according to a further feature of the invention, the troughs, in particular the bottoms of the troughs, are arranged at an acute angle relatively to each other, such angle being open towards the back-rest. This orientation of the troughs suits extremely well the anatomical position of the ischium tubers.

An embodiment of the invention is, by way of example, illustrated in the drawings, wherein:

FIGURE 1 is a vertical section through a seat according to the invention;

FIGURE 2 is a perspective view of the seat according to FIGURE 1, seen in the direction of the arrow II;

FIGURE 3 is an enlarged sectional view of a part of the seat according to FIGURE 1;

FIGURE 4 is an enlarged plan view of the support surface for the ischium tubers, showing the troughs; and FIGURE 5 is an enlarged fragmentary sectional view taken along the line V—V of FIGURE 4.

The seat shown in the drawings and indicated generally by the reference 17 is of sheet-like form and is made for example of a polyester resin reinforced with glass fibres. The seat comprises a seat portion 2 and an integral back-rest. The back rest 1 has formed therein a support surface 4 adapted to support the os sacrum to whose shape it conforms, whilst the seat portion 2 has formed therein a support surface 3 adapted to support the ischium tubers.

The support surface 3 has therein two flat elongated troughs 29 arranged symmetrically with respect to the central vertical plane of the seat. The lines 18 to 21 shown on the support surface 3 in FIGURE 4 are contour lines connecting points of identical level, the plane of the support surface 3 being the reference plane. The line 18 surrounds the entire trough, i.e. is in this reference plane, whereas the line 20 approximately indicates the extent of the substantially plane trough bottom, which is of elongate form.

The greater spacing of the lines 18, 19 and 20 in the rearward zone 22 of the trough indicates the gradual inclination with which the trough terminates in the rearward zone, whereas the closer spacing of the lines 18, 19 and 20 at the forward end 23 and at the sides 24 and 25 shows the steeper inclination of the trough walls at these points.

The troughs, and in particular the bottom of the troughs, are arranged at an acute angle relatively to each other, such angle being open towards the back rest.

The lateral edge 26 of the support surface adjacent the troughs projects slightly out of the plane of the support surface 3, this being indicated by the contour line 21.

The line 27 designates the edge of the support surface 3 externally of which the seat portion 2 declines downwardly. At the rearward end 28 of the support surface 3, the latter merges in a rounded-off manner into the back rest 1.

The section shown by FIGURE 5 is drawn to a greatly enlarged scale so as to illustrate clearly the shape of a trough 29 and of the adjacent raised lateral edge 26.

The shape of the troughs is such as to suit varying body dimensions. Thus, when the seat is used by someone in which the spacing of the ischium tubers from the back rest or from the support surface in the back rest is only slight, then the ischium tubers will bear approximately on the lowermost point of the trough and the inclination of the trough walls will prevent any forward sliding of the ischium tubers and thus also prevent the faulty pelvic inclination in the sitting posture connected therewith.

In the case of other persons, the ischium tubers will abut more in the region of the inclined walls of the troughs, thus also providing for improved support.

In an embodiment of the invention which has shown itself to be very satisfactory, each trough 29 has a length of approximately 12 centimetres and a width of approximately 5 centimetres. The remaining plane residual surface 30 on both sides of the central plane 31 has a width of approximately five to six centimetres. The entire supporting surface is thus approximately eighteen centimetres wide and has a depth of approximately nineteen centimetres. These dimensions can of course be slightly varied in conformity with anatomical conditions.

I claim as my invention:

1. A seat device adapted to the shape of the body comprising a seat portion and a back rest portion, said seat portion being shaped generally to the form of the seat and thighs of a person sitting in normal relaxed position, and the back rest portion being shaped generally to the form of the back of a person sitting in normal relaxed position, said seat portion being provided at its central portion near the rear of said seat portion with a slightly protruding area forming a firm support for the ischium tubers only of the seated person, and the seat portion being provided with two flat, elongated troughs each of which troughs is arranged symmetrically with respect to the central plane of the seat portion and each of which troughs is adapted to support an ischium tuber.

2. The seat device as claimed in claim 1, wherein the depth of each trough is approximately three millimeters.

3. The seat device as claimed in claim 1 wherein each trough has a length of approximately twelve centimetres and a width of approximately five centimetres and said troughs being spaced apart by a distance of approximately five to six centimetres.

4. A seat device adapted to the shape of the body comprosing a seat portion and a back rest portion, said seat portion being shaped generally to the form of the seat and thigh of a person sitting in normal relaxed position, and the back rest portion being shaped generally to the form of the back of a person sitting in normal relaxed position, said seat portion being provided at its central portion near the rear of said seat portion with a slightly protruding area forming a firm support for the ischium tubers only of the seated person, said seat portion having two flat, elongated troughs each of which troughs is arranged symmetrically with respect to the central plane of the seat portion and each of said troughs being adapted to support an ischium tuber, the rear end of each trough being provided with a gradual inclination and the front end and sides of each trough being provided with a steeper inclination.

5. The seat device as claimed in claim 4, wherein the lateral edge of said seat portion adjacent to each trough projects slightly above the plane of the seat portion.

6. The seat device as claimed in claim 5, wherein said lateral edge projects above the plane of the seat portion approximately one-third of the greatest trough depth.

7. The seat device as claimed in claim 6, wherein the bottoms of said troughs are arranged at an acute angle with respect to each other, with said angles being open towards said back rest portion.

References Cited in the file of this patent

UNITED STATES PATENTS

| | | |
|---|---|---|
| 1,716,871 | Weldon | June 11, 1929 |
| 2,970,638 | Halter | Feb. 7, 1961 |
| 3,034,830 | Avedon | May 15, 1962 |
| 3,081,129 | Ridder | Mar. 12, 1963 |